United States Patent [19]
Murase et al.

[11] Patent Number: 5,915,855
[45] Date of Patent: Jun. 29, 1999

[54] BAR LIGHT SOURCE FOR AN EDGE LIGHT PANEL AND AN ILLUMINATION SIGN DEVICE USING THE SAME

[75] Inventors: Shinzo Murase; Kazuo Kishi, both of Shiga-ken, Japan

[73] Assignee: Meitaku System Co., Ltd, Shiga-ken, Japan

[21] Appl. No.: 08/939,488

[22] Filed: Sep. 29, 1997

[51] Int. Cl.⁶ ...................................... F21V 7/04
[52] U.S. Cl. .................. 40/546; 362/26; 362/31
[58] Field of Search ............. 40/546; 362/26–27, 362/28, 29, 30, 31

[56] References Cited

U.S. PATENT DOCUMENTS

| | | | |
|---|---|---|---|
| 5,262,928 | 11/1993 | Kashima et al. | 362/31 |
| 5,440,464 | 8/1995 | Nowlin et al. | 40/546 |
| 5,499,165 | 3/1996 | Holmes | 362/31 |
| 5,521,797 | 5/1996 | Kashima et al. | 362/31 |
| 5,555,654 | 9/1996 | Hermann | 40/546 |
| 5,572,818 | 11/1996 | Churchill | 362/26 |
| 5,709,447 | 1/1998 | Murakami et al. | 362/31 |
| 5,791,757 | 8/1998 | O'Neil et al. | 362/31 |

*Primary Examiner*—Michael F. Trettel
*Assistant Examiner*—Fredrick Conley
*Attorney, Agent, or Firm*—Oblon, Spivak, McClelland, Maier & Neustadt, P.C.

[57] ABSTRACT

A bar light source for an edge light panel and an illumination sign board using the same. The bar light source includes a transparent bar member such as acrylic resin. The transparent bar member has a light-source light supplying portion formed at an end of thereof, a transparent incident light supply surface formed elongately on the front surface thereof, and a light guiding pattern printed on the back surface thereof. An optical cable propagates light from a lamp to the light-source light supplying portion. The light guiding pattern guides light to control uniformly the brightness of the bar light source. Thus, the light is supplied onto the incident end surface of the edge light panel in an area illumination board.

11 Claims, 6 Drawing Sheets

BAR LIGHT SOURCE FOR AN EDGE LIGHT PANEL AND AN ILLUMINATION SIGN DEVICE USING THE SAME

BACKGROUND OF THE INVENTION (1) Field of the Invention

This invention relates to a bar light source for an edge light panel that supplies incident light into an edge light panel for area illumination. The present invention also relates to an illumination sign device using the bar light source.

(2) Description of the Related Art

The edge light panel (refereed to as a light guiding plate) of that type for area illumination is used as a liquid crystal back lighting function mounted on, for example, a liquid crystal display device, or as an illumination signboard display stand.

The edge light panel is generally formed of a transparent substrate of transparent acrylic resin and has one end surface or plural end surfaces acting as incident end surfaces. The edge light panel is formed by printing a light guiding pattern formed of meshed dots for incident light guidance on the back surface thereof and then processing the intermediate product. The edge light panel may be formed by one-piece molding upon forming a transparent substrate. To order to supply incident light to the incident end surface of an edge light panel, a hot cathode or cold cathode fluorescent light source is mounted adjacent to the incident end surface. The light guiding pattern guides incident light to provide area illumination.

In such a configuration, the edge light panel can preferably convert the incident light from the fluorescent light source into area illumination with high brightness and high uniformity. However, there is the disadvantage in that the fluorescent light source used for the edge light panel radiates heat and must be replaced every time its serviceable life ends. The cold cathode fluorescent light source improves the disadvantage of the cold fluorescent light source, but cannot solve the basic problems described above.

The heat radiated from the fluorescent light source rises the temperature of the edge light panel, the liquid crystal display surface under the liquid crystal back light, the film or panel for an illumination signboard to be illuminated, or the like, thus affecting adversely them. The exchange work of a terminated lamp requires disassembling the liquid crystal device, illumination signboard, or the like. A road sign using an edge light panel, for example, installed at an elevated place requires an exchanging work at a high place. These disadvantages result in complicated works.

SUMMARY OF THE INVENTION

The present invention is made to overcome the above-mentioned problems. It is the object of the invention is to provide a bar light source for an edge light panel that can be used instead of a fluorescent light source.

Another of the present invention to provide an illumination sign device using the bar light source.

According to the present invention, a transparent bar member supplies light-source light from its end in the elongate direction or the intermediate position thereof. The light is radiated as an incident light perpendicularly to the light propagating direction and from the front surface or transparent surface of the transparent bar member onto the incident end surface of an edge light panel. A light guiding pattern for light-source light guidance is formed on the back surface of the transparent bar member to perform a density modulation in inverse proportion to the amount of light so that the incident light is supplied so as to uniform the brightness in the elongate direction of the transparent bar member. The above-mentioned structure is handled as a bar light source. Instead of a fluorescent lamp, the bar light source is used to radiate an incident light with uniform brightness onto the incident edge surface of an edge light panel, thus performing area illumination of the edge light panel.

In order to accomplish the above-mentioned object, a bar light source comprises a bar light source for an edge light panel, comprising a transparent bar member having an incident light supply surface confronting an incident end surface of an edge light panel being a transparent surface on the front side thereof, and a light-source light supplying portion being an end in an elongate direction or an intermediate portion thereof; and a light guiding pattern for light-source light guidance formed on the back surface of the transparent bar member, for density-modulating light in inverse proportion to the light amount of the light-source light propagated in an elongate direction from the light-source light supplying portion.

According to the present invention, the transparent bar member comprises a straight bar member of transparent resin or transparent glass having a straight incident light supply surface and confronting the incident end surface of the edge light panel.

According to the present invention, the transparent bar member comprises an angled bar member of transparent resin or transparent glass arranged adjacent to the edge light panel and having plural straight incident light supply surfaces each in an L-shaped, U-shaped, or rectangularly framed form so as to confront plural incident end surfaces.

According to the present invention, the light guiding pattern is printed or transferred onto said transparent bar member, or is machined and then processed.

According to the present invention, the light guiding pattern is formed by one-piece molding with the transparent bar member.

According to the present invention, the light-source light supplying portion at an end in an elongate direction or an intermediate portion of the transparent bar member is formed so as to confront an end of an optical cable for light transmission and to receive arbitrarily light fluxes from a remote lamp via the optical cable.

According to the present invention, an illumination sign device using a bar light source for an edge light panel, comprising an illumination sign such as a road sign installed at an elevated place, for back-lighting a sign film or sign panel using the edge light panel; a bar light source for an edge light panel including a transparent bar member having an incident light supply surface confronting an incident end surface of an edge light panel being a transparent surface on the front side thereof, and a light-source light supplying portion being an end in an elongate direction or an intermediate portion thereof; a light guiding pattern for light-source light guidance formed on the back surface of the transparent bar member, for density-modulating light in inverse proportion to the light amount of the light-source light propagated in an elongate direction from the light-source light supplying portion; a lamp light source for supplying light-source light of the bar light source, the lamp light source being installed so as to be arbitrarily changeable at a low place; and an optical cable connecting the light source with the light-source light supplying portion of the bar light source, for supplying light-source light to the bar light source.

In the illumination sign device installed at a high place, a lamp with a limited serviceable life which sends light to the bar light source can be replaced at a low place.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
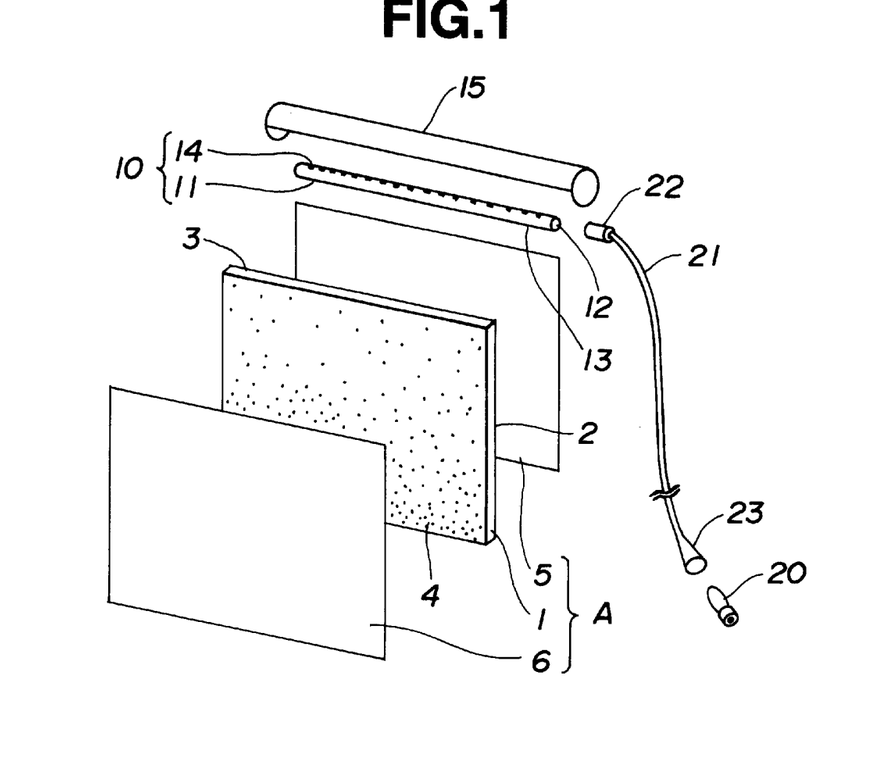
FIG. 1 is a disassembled perspective view showing the relation between an edge light panel and a bar light source in an area illumination device.
Figure 2:
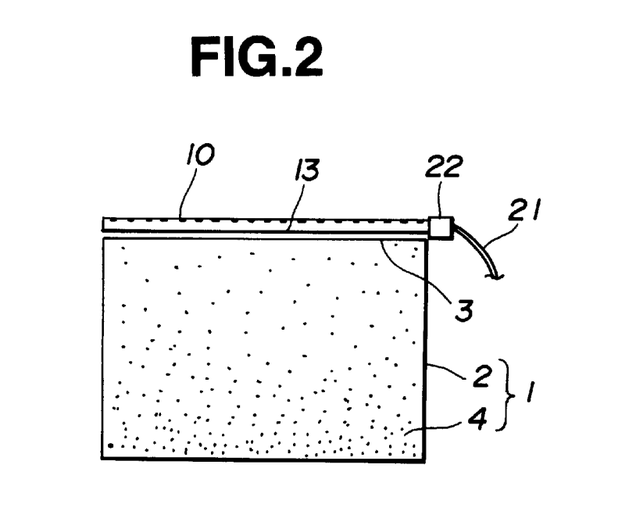
FIG. 2 is a front view showing the relation between an edge light panel and a bar light source.
Figure 3:
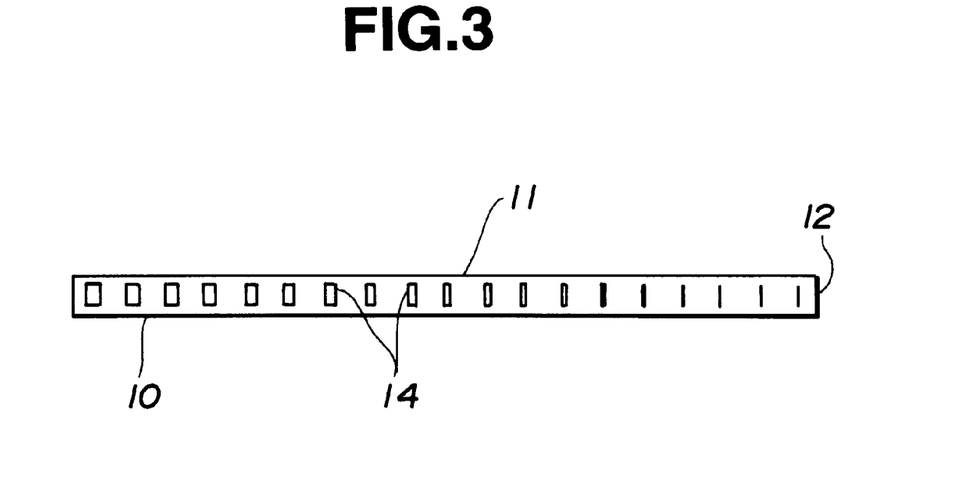
FIG. 3 is a back view showing a bar light source.
Figure 4:
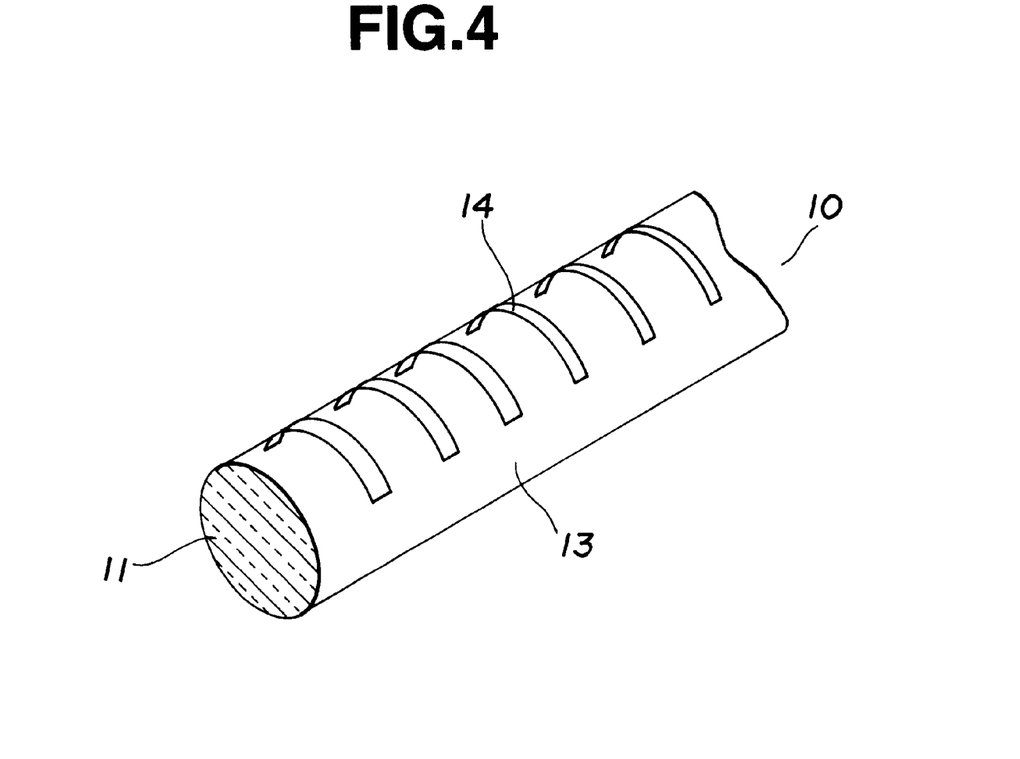
FIG. 4 is a perspective view partially showing an enlarged portion of the bar light source in FIG. 3.

The embodiments according to the present invention will now be described below in detail with reference to the attached drawings. Referring to FIG. 1, letter A represents an area illumination device. Numeral 1 represents an edge light panel, numeral 5 represents a reflective sheet, numeral 6 represents a diffuse sheet, and numeral 10 represents a bar light source for the edge light panel 1.

In the edge light panel 1, one end surface of the transparent substrate 2 acts as an incident end surface 3. The edge light panel 1 is formed by screen-printing the light guiding pattern 4 formed of meshed dots for incident light guidance is screen-printed on the back surface of the transparent substrate 2 and then the intermediate product is machined. The light guiding pattern 4 may be one-piece molded upon forming the transparent substrate 2.

The bar light source 10 includes a transparent bar member 11 and a light guiding pattern 14. The transparent bar member 11 has an incident light supply surface 13 confronting an incident end surface 3 of the edge light panel 1 being a transparent surface on its front side and a light-source light supplying portion 12 at an end in an elongate direction or an intermediate position. The light guiding pattern 14 for light-source light guidance is arranged on the back surface of said transparent bar member 11, for density-modulating light in inverse proportion to the light amount of said light-source light in an elongate direction from said light-source light supplying portion 12. In the embodiments shown in FIGS. 1 to 8, the transparent bar member 11 comprises a straight bar member of transparent resin or transparent glass having a straight incident light supply surface 13 and confronting an incident end surface 3 of the edge light panel. In the embodiments shown in FIGS. 9 and 10, the transparent bar member 11 comprises an angled bar member of transparent resin or transparent glass having plural straight incident light supply surfaces 13 with an U-shaped, or triangular shaped form and confronting plural incident end surfaces 3 adjacent to the edge light panel 1 used for, for example, a road sign. In the bar light source 10 shown in FIGS. 1 to 8, the light-source light supplying portion 12 is formed at one end of the straight transparent bar member 11 in the elongate direction. In the bar light source 10 shown in FIGS. 9 and 10, the light-source light supplying portion 12 is formed at the intermediate position of the transparent bar member 11 formed of the angled bar member so as to branch and protrude toward the opposite side of the edge light panel, with the same cross section as that of other portions.

The bar light source 10 is made of a transparent resin such as acrylic resin or polycarbonate resin, or a transparent glass with good light transparency. Using molding or machining means, the bar light source is shaped into a straight or angled round bar, a half-round bar, a rectangular or square bar, or a polygon bar such as hexagon or octagon. The diameter, thickness, or width of the bar light source is set to be substantially equivalent to that of the incident end surface 3 of a sole edge light panel 1, that is, is set to be the same as or slightly larger than that thereof One angled surface, flat surface or polygonal surface of the front side of the bar light source acts as the incident light supply surface. The light guiding pattern 14 is formed on the back surface of the bar light source by printing or transferring it onto the transparent bar member 11, or processing it after machining. The light guiding pattern may be formed by one-piece molding upon forming the transparent bar member 11.

In the bar light source 10, the light guiding pattern 14 reflects suitably and irregularly light from the light-source light supplying portion 12 to the transparent bar member 11 to radiate as incident light to the edge light panel 1. Through printing or transferring, a material with a high reflecting property such as white series ink, white series transfer material, silver series ink or silver series transfer material is used for the light guiding pattern 14. When machining or transferring is made, fine channels, fine holes, fine flutes, or fine projections are used for the light guiding pattern 14. The light guiding pattern 14 performs a density modulation in the remote direction and in the elongate direction from the light-source light supplying portion 12 or the adjacent portion thereof In the density modulation, the irregular reflection is stimulated in inverse proportion to the light amount of the light-source light by controlling propagation of the light-source light remotely and elongately from the incident light supplying portion 12, so that the brightness of the incident light supply surface 13 is uniformed in the elongate direction.

Figure 5:
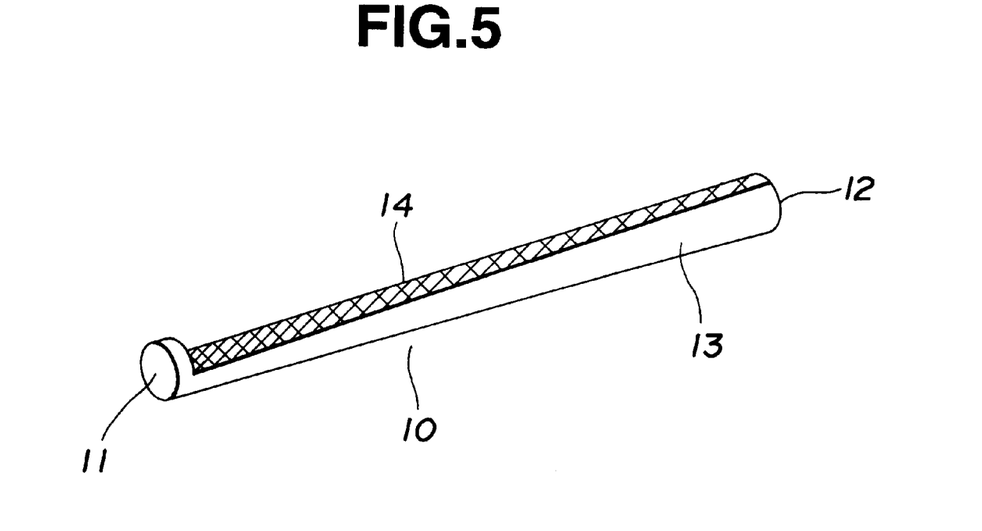
FIG. 5 is a perspective view showing a bar light source, with the back surface upward, according to another embodiment of the present invention.
Figure 6:
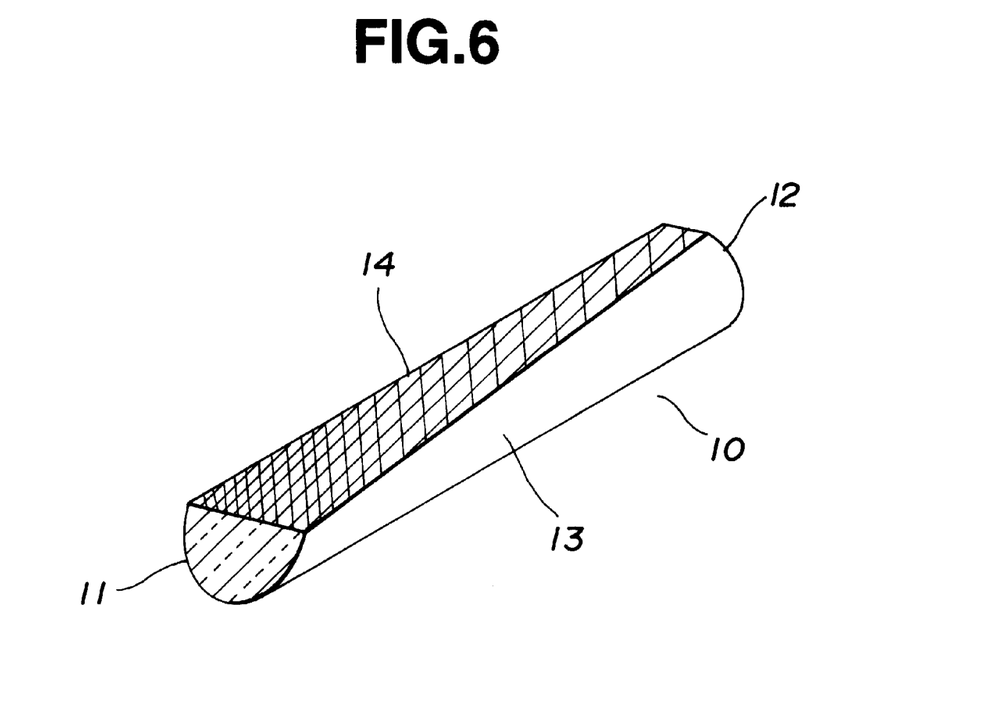
FIG. 6 is an enlarged perspective view partially showing a the bar light source in FIG. 5.

FIGS. 1 to 4 show an example of performing a density modulation using the stripe-like light guiding patterns 14. The pitch intervals of transparent portions are gradually narrowed by sequentially amplifying the widths of the patterns printed or transferred on the back surface of the transparent round bar member 11, so that the width is peaked at the front end. FIGS. 5 and 6 show an example of performing a density modulation by using fine line patterns formed on the back surface of the transparent member 11 being a partially wedge-shaped round bar. The transparent member 11 has a sloped surface in a wedge form elongately extending from the light-source light supplying portion 12, on its back side. In the fine line pattern, the pitch of the fine grooves in cross line is gradually decreased to improve the brightness by shortening the irregular reflection cycle of light in the elongate direction.

Figure 7:
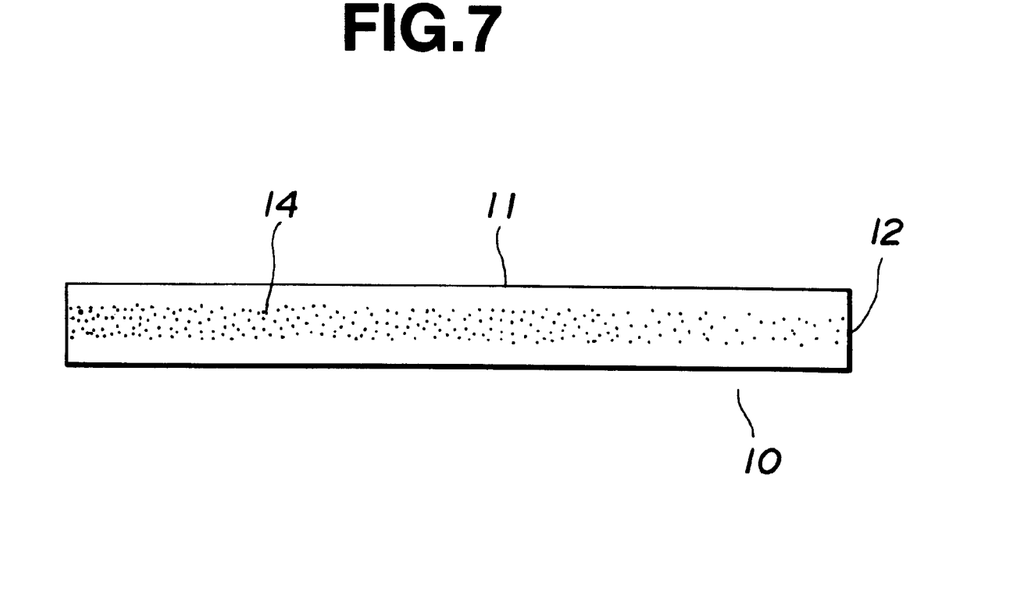
FIG. 7 is a back view showing a bar light source according to another embodiment of the present invention.
Figure 8:
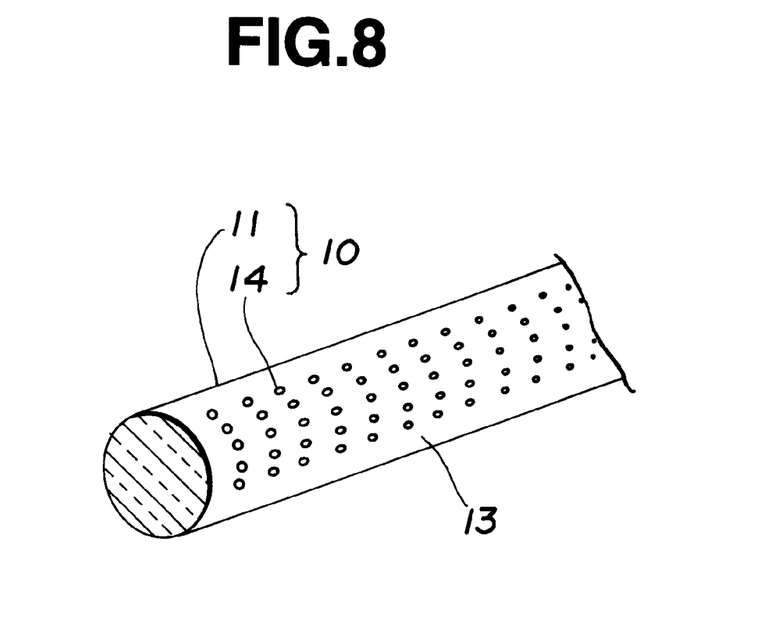
FIG. 8 is an enlarged perspective view partially showing the bar light source in FIG. 7.
Figure 9:
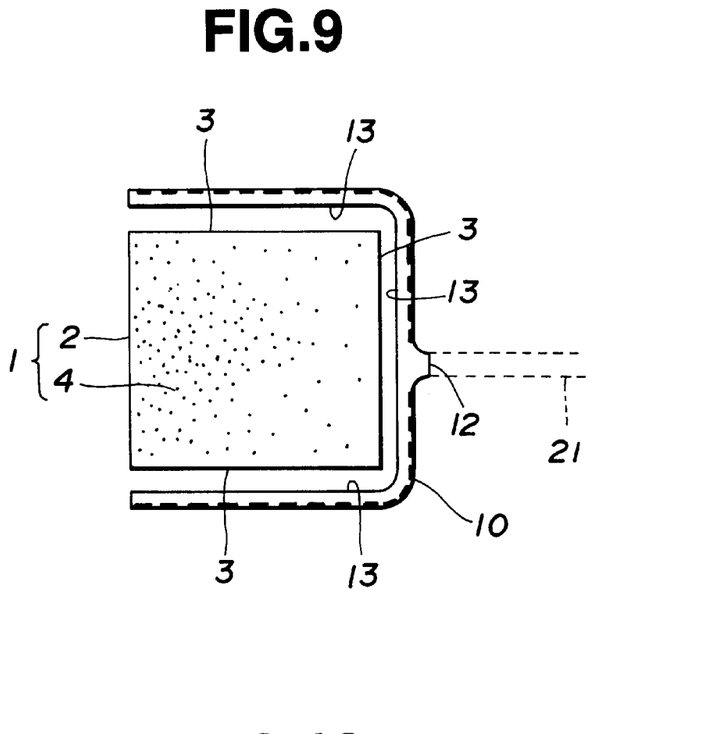
FIG. 9 is a front view showing the relation between an edge light panel and a bar light source according to another embodiment of the present invention.
Figure 10:
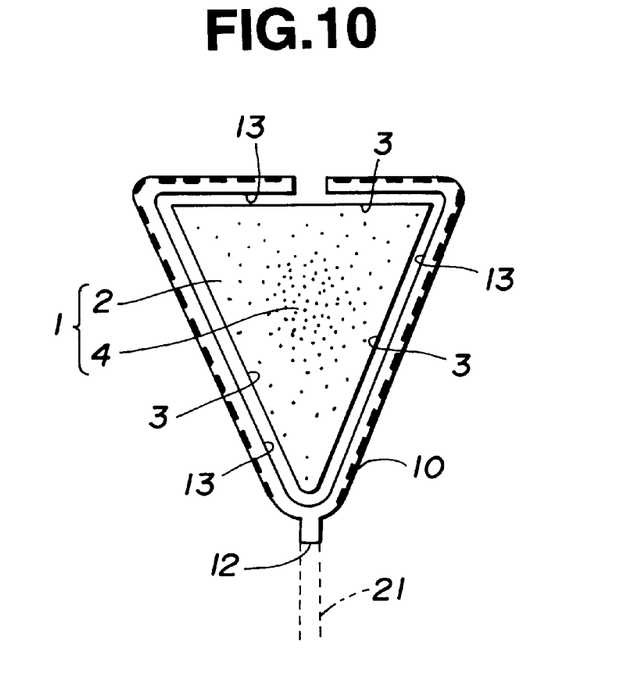
FIG. 10 is a front view showing the relation between an edge light panel and a bar light source according to further another embodiment of the present invention.

FIGS. 7 and 8 shows an example of performing a density modulation using a meshed dot pattern. In the meshed dot pattern, the diameters of meshed dots printed or transferred on the back surface of the round transparent bar 11 are gradually increased and the meshed dot to area ratio is increased without varying the positional relation of patterns arranged at equal intervals. (In FIG. 9, the density modulation is performed by using stripe-like patterns 14 formed on the round transparent bar material 11. In FIG. 10, the density modulation is performed by using dot patterns 14 formed on the round transparent bar material 11.)

Moreover, in the bar light source 10, the light-source supplying portion 12 being an end in the elongate direction of the transparent bar member 11 or a projected portion for light-source light reception formed at the middle position of the transparent bar member 11 confronts the front end of the optical cable 21 for optical transmission to receive arbitrarily light flux from the lamp light source remotely arranged, via the optical cable 21.

In this embodiments, the light-source light supplying portion 12 has the round surface of an end in the elongate direction or the round surface of the protruded end. In these embodiments, an adapter 22 attached to the optical cable 21 is connected to the end of the light-source light supplying portion 10 to supply light from a high-intensity lamp source 20 such as a hydrogen lamp, metal halide lamp, high-pressure sodium lamp, or the like to the bar light source 10 via the optical cable 21.

The optical cable 21 is formed of a cable in which a flexible pipe is filled with transparent silicone with excellent light transparency in a sol state. Both ends of the optical cable 21 are closed with a transparent glass material. The optical cable 21 propagates a light flux from the lamp light source 20 to the light-source light supplying portion 12 of the transparent material 11.

Referring to FIG. 1, numeral 15 represents a bar light-source cover and numeral 23 represents a receptacle for a lamp light source 20.

In FIGS. 1 to 4, the bar light source 10 has a diameter of 1 cm and a length of 45 cm, and is used for an A-3 size edge light panel 1. When a 60W metal halide lamp acting as the lamp light source 20 supplies light to the bar light source 10 via the optical cable 20, the bar light source 10 provides uniformly a luminance brightness of 600 cd/m2 in the elongate direction. Hence, uniform luminance brightness can be practically secured according to the wattage of the lamp light source 20.

Figure 11:
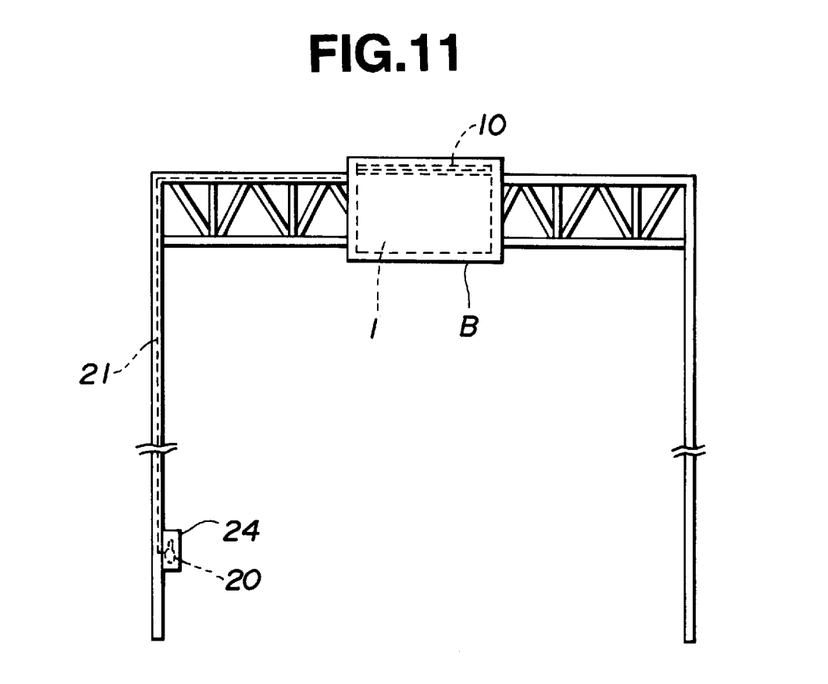
FIG. 11 is a front view showing an installation state of an illumination sign device.
Figure 12:
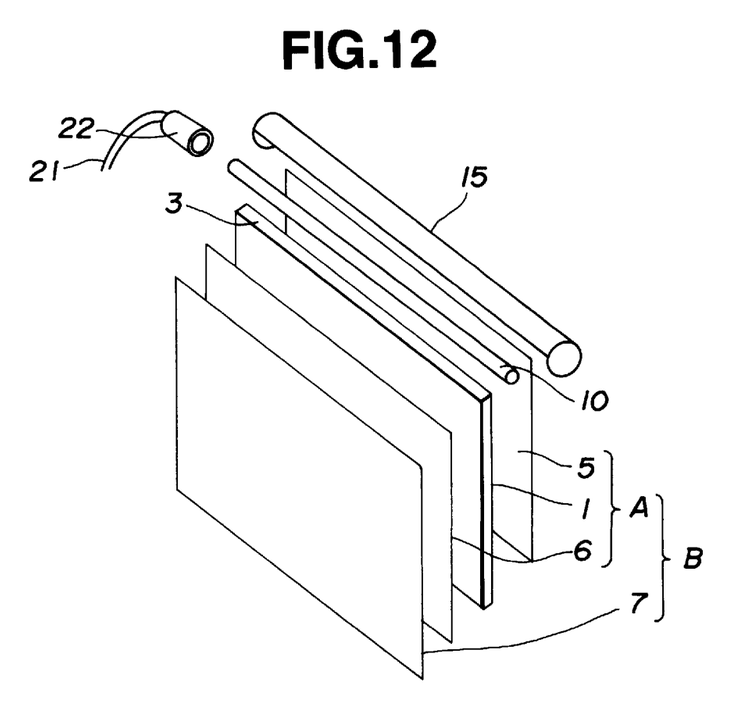
FIG. 12 is a disassembled perspective view showing the major portion of an illumination sign device.

FIGS. 11 and 12 show an embodiment of an illumination sign device embodying the bar light source 10 for the edge light panel.

The illumination sign device comprises an illumination sign B such as a road sign installed at an elevated place, for back lighting a sign film or sign panel 8 using an edge light panel 1; a bar light source 10 for supplying incident light to the edge light panel 1, the bar light source 10 having a transparent bar member 11 having an incident light supply surface confronting an incident end surface 3 of an edge light panel 1 being a transparent surface on the front side thereof, and a light-source light supplying portion 12 being an end in an elongate direction or the intermediate portion thereof, and a light guiding pattern 14 for light-source light guidance formed on the back surface of said transparent bar member 11, for density-modulating light in inverse proportion to the light amount of said light-source light propagated in an elongate direction from said light-source light supplying portion 12; a lamp light source 20 for supplying light-source light of the bar light source 10, the lamp light source being installed so as to be arbitrarily replaceable at a low place; and an optical cable 21 connecting the light source 20 with the light-source light supplying portion 12 of the bar light source 10, for supplying light-source light to the bar light source 10.

In such a configuration, the bar light source 10 is used for the illumination sign B noticed at a high place over an expressway. The optical cable 21 connects the bar light source 10 with the lamp light source 20 housed in the light-source box 24 installed near to the ground. In the light-source box 24, the lamp light source 20 can be easily replaced independently of the illumination sign B without using a high-place working vehicle, or limiting the traffic for vehicles on a road.

Like numerals are attached to like elements. Hence, duplicate explanation will be omitted here.

In addition to the above-mentioned examples shown in figures, according to the present invention, the transparent bar member can be angled in a U-shaped or triangular form to have plural straight incident light supplying surfaces confronting plural incident end surfaces of an edge light panel. Moreover, the transparent bar member can be shaped in an L-shaped or rectangularly-framed form along the outline of an edge light panel to provide plural straight incident light supply surfaces. Light source supplying portions can be formed at the both ends in the elongate direction of the transparent bar member. The light guiding pattern performs a density modulation in the elongate direction to adjust the middle portion between the light-source supplying portions to a peak value. The light-source supplying portion can be formed to confront the lamp light source and to receive the light flux arbitrarily. The light-source supplying portion also can be formed to confront the front end of the optical cable. In either case, the light-source supplying portion can be formed so as to have a slightly recessed portion to accept a lamp light source or the front end of an optical cable. The surface of the light-source light supplying portion can be roughed to stimulate light irregular reflection. An optical fiber can be used for the optical cable, instead of the transparent silicone. The illumination sign device can be used for a sign for a station building. In addition, as to the bar light source, the transparent bar member, the light guiding pattern, the lamp light source, the optical cable used if necessary, and the concrete shape, structure, substance, and the like of an illumination sign in an illumination sign device, or the like, the relation between them, and additions to them, it should be noted that various forms and modifications can be embodied within the scope without departing from the subject matter of the present invention.

The present invention with the above-mentioned configuration defined in claims 1 to 5 can provide the bar light source for a edge light panel that can supply incident light with uniform brightness onto an edge light panel, in place of the conventional fluorescent lamp, without heat radiation. In the bar light source, a lamp light-source can be replaced without disassembling the main equipment.

According to the bar light source defined the claim 6, the lamp light source with a limited serviceable life can be arbitrarily arranged at a position remotely apart from equipment using an edge light panel (or the area illumination device), using an optical cable connected to the bar light source. The present invention defined the claim 7 can provide the illumination sign device that uses a bar light source for an edge light panel, whereby the lamp light source can be replaced at a low place even if the main portion is installed at a high place.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed as new and as desired to be secured by Letters Patent of the United States is:

1. A bar light source for an edge light panel, comprising:
   a transparent bar member having an incident light supply surface configured to confront an incident end surface of an edge light panel having a transparent surface on a front side thereof and a light-source light receiving portion configured to receive input light provided at at least one of a first end and an intermediate portion of said transparent bar member; and
   a light guiding pattern for light-source light guidance formed on a back surface of said transparent bar member, configured to intensity-modulate light in an inverse proportion to an amount of input light propagated in an elongate direction from said light-source light receiving portion.

2. The bar light source for an edge light panel as defined in claim 1, wherein said transparent bar member comprises a straight bar member of transparent resin or transparent glass having a straight incident light supply surface and confronting the incident end surface of said edge light panel.

3. The bar light source for an edge light panel as defined in claim 1, wherein said transparent bar member comprises an angled bar member of transparent resin or transparent glass arranged adjacent to said edge light panel and having plural straight incident light supply surfaces each in an L-shaped, U-shaped, or rectangularly framed form so as to confront plural incident end surfaces.

4. The bar light source for an edge light panel as defined in claim 1, 2, or 3, wherein said light guiding pattern is at least one of printed, transferred onto said transparent bar member and machined and then processed.

5. The bar light source for an edge light panel as defined in claim 1, 2, or 3, wherein said light guiding pattern is formed by one-piece molding with said transparent bar member.

6. The bar light source with an edge light panel as defined in claim 1, or 3, wherein said light-source light supplying portion at an end in an elongate direction or intermediate portion of said transparent bar member is formed so as to confront an end of an optical cable for light transmission and to receive arbitrarily light fluxes from a remote lamp via said optical cable.

7. An sign laminating device using a bar light source for an edge light panel, comprising:
   a sign installed at an elevated place,
   a bar light source including a transparent bar member having an incident light supply surface configured to confront an incident end surface of an edge light panel of said sign having a transparent surface on a front side thereof, and a light-source light receiving portion configured to receive input light provided at at least one of a first end and an intermediate portion of said transparent bar member; a light guiding pattern for light-source light guidance formed on a back surface of said transparent bar member, configured to intensity-modulate light in inverse proportion to an amount of input light from said light-source light receiving portion propagated in an elongate direction of said transparent bar;
   a lamp light source for supplying input light to said bar light source, said lamp light source being installed so as to be arbitrarily changeable at a low place; and
   an optical cable connecting said light source with said light-source light receiving portion of said transparent bar, for supplying input light to said light-source light receiving portion.

8. A bar light source for an edge panel, comprising:
   a transparent bar member having an incident light supply surface configured to transfer light to an incident end surface of an edge light panel;
   an input light receiving portion provided at at least one of a first end and an intermediate portion of said transparent bar member;
   wherein a back surface of said transparent bar is configured to reflect light from said light receiving portion toward said incident light supply surface, such that said back surface is configured to have a greater reflecting ability at positions with a greater distance from said light source than position closer to said light source.

9. The bar light source according to claim 8, wherein said back surface of said transparent bar is provided with reflective elements providing a reflective pattern, wherein said reflective pattern has an increasing density in accordance with an increasing distance from said light source along said back surface of said transparent bar.

10. The bar light source with an edge light panel as defined in claim 4, wherein said light source light supplying portion at an end in an elongate direction or intermediate portion of said transparent bar member is formed so as to confront an end of an optical cable for light transmission and to receive arbitrarily light fluxes form a remote lamp via said optical cable.

11. The bar light source with an edge light panel as defined in claim 5, wherein said light source light supplying portion at an end in an elongate direction or intermediate portion of said transparent bar member is formed so as to confront an end of an optical cable for light transmission and to receive arbitrarily light fluxes form a remote lamp via said optical cable.

* * * * *

UNITED STATES PATENT AND TRADEMARK OFFICE
CERTIFICATE OF CORRECTION

PATENT NO. : 5,915,855

DATED : June 29, 1999

INVENTOR(S): Shinzo MURASE, et al.

It is certified that an error appears in the above-identified patent and that said Letters Patent is hereby corrected as shown below:

On the title page, item [30] has been omitted. It should be:

--[30]   Foreign Application Priority Data
   Sep. 27, 1996 [JP] Japan .................. 8-277334--

Signed and Sealed this

Eleventh Day of April, 2000

*Attest:*

Q. TODD DICKINSON

*Attesting Officer*           *Director of Patents and Trademarks*